United States Patent
Barsness et al.

(10) Patent No.: US 10,552,421 B2
(45) Date of Patent: *Feb. 4, 2020

(54) MONITORING STATES OF PROCESSING ELEMENTS

(71) Applicant: International Business Machines Corporation, Armonk, NY (US)

(72) Inventors: Eric L. Barsness, Pine Island, MN (US); Michael J. Branson, Rochester, MN (US); Ryan K. Cradick, Oronoco, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,866

(22) Filed: Jul. 31, 2018

(65) Prior Publication Data

US 2018/0341683 A1    Nov. 29, 2018

Related U.S. Application Data

(63) Continuation of application No. 14/969,952, filed on Dec. 15, 2015, now Pat. No. 10,067,703.

(51) Int. Cl.
*G06F 1/24* (2006.01)
*G06F 9/00* (2006.01)
(Continued)

(52) U.S. Cl.
CPC ...... *G06F 16/24568* (2019.01); *G06F 3/0481* (2013.01); *G06F 3/0604* (2013.01);
(Continued)

(58) Field of Classification Search
CPC .......... G06F 16/24578; G06F 16/9535; G06F 16/9024
See application file for complete search history.

(56) References Cited

U.S. PATENT DOCUMENTS

| 7,672,964 B1 | 3/2010 | Yan et al. |
| 8,527,458 B2 | 9/2013 | Park et al. |

(Continued)

OTHER PUBLICATIONS

Dosch et al., "Transforming Stream Processing Functions into State Transition Machines," Software Engineering Research Applications, SERA 2004, Lecture Notes in Computer Science, vol. 3647, pp. 1-18, 2005, © Springer-Verlag Berlin Heidelberg 2005.

(Continued)

*Primary Examiner* — Xuxing Chen
(74) *Attorney, Agent, or Firm* — Scott S. Dobson (57) ABSTRACT

Managing a streaming environment of an operator graph by performing corrective actions based on a threshold of changes in state being reached. An operator graph includes states of information stored within a memory of a first processing element configured to process a set of tuples. The memory of the first processing element is monitored. A change in the information from a first state to a second state is identified, based on the monitoring. The change from the first state to the second state is recorded. A determination is made if the change from the first state to the second state has caused a threshold of changes between the states of the information to be reached. A corrective action is performed that modifies a configuration of the operator graph in response to the threshold of changes between the states of the information being reached.

20 Claims, 5 Drawing Sheets

(51) Int. Cl.
    *G06F 16/2455*     (2019.01)
    *G06F 3/0481*     (2013.01)
    *G06F 3/06*     (2006.01)

(52) U.S. Cl.
    CPC .......... *G06F 3/0634* (2013.01); *G06F 3/0653* (2013.01); *G06F 3/0673* (2013.01)

(56) References Cited

U.S. PATENT DOCUMENTS

| | | |
|---|---|---|
| 8,620,945 B2 | 12/2013 | Chen et al. |
| 8,683,074 B2 | 3/2014 | Meek et al. |
| 8,775,482 B2 | 7/2014 | Chkodrov et al. |
| 2009/0031327 A1 | 1/2009 | Nesamoney et al. |
| 2010/0217953 A1 | 8/2010 | Beaman et al. |
| 2011/0302196 A1 | 12/2011 | Bouillet et al. |
| 2012/0065813 A1 | 3/2012 | Nguyen et al. |
| 2012/0150528 A1 | 6/2012 | Upadhyaya et al. |
| 2012/0179809 A1 | 7/2012 | Barsness et al. |
| 2017/0168748 A1 | 6/2017 | Barsness et al. |

OTHER PUBLICATIONS

List of IBM Patents or Patent Applications Treated as Related, dated Jul. 30, 2018, pp. 1-2.

MONITORING STATES OF PROCESSING ELEMENTS

BACKGROUND

The present disclosure relates to enhancing the quality of streaming environments, and more specifically, to altering an operator graph of a stream computing environment in response to a change in the state of a processing element in the operator graph.

Stream computing may be utilized to provide real-time analytic processing to large quantities of data. Stream computing may be used for scientific research purposes, such as weather forecasting and complex physics modelling. Stream computing may be used for commercial purposes, such as real-time inventory management and stock market tracking. Stream computing may be used for medical purposes, such as analyzing complex and interconnected functions of the human body. Stream computing may be used by end users to more immediately and accurately understand and contextualize large amounts of information.

SUMMARY

Embodiments of the disclosure provide a method, system, and computer program product for processing data.

According to an aspect, embodiments disclose a method for managing a streaming environment of an operator graph by monitoring changes between states of information stored within a memory of a first processing element executed on a first compute node of the operator graph. The first processing element is configured to process a set of tuples. The method includes monitoring the memory of the first processing element. The method includes identifying a change in the information from a first state to a second state based on the monitoring. The method includes recording the change from the first state to the second state. The method includes determining whether the change from the first state to the second state has caused a threshold of changes between the states of the information to be reached. The method includes performing a corrective action that modifies a configuration of the operator graph in response to the threshold of changes between the states of the information being reached.

According to another aspect, embodiments disclose a system for managing a streaming environment of an operator graph by monitoring changes between states of information stored within a memory of a first processing element executed on a first compute node of the operator graph. The first processing element is configured to process a set of tuples. The system includes a system memory, communicatively coupled with a processor device, a stream manager, and a state manager. The stream manager is configured to monitor the memory of the first processing element. The stream manager is configured to identify a change in the information from a first state to a second state based on the monitoring. The stream manager is configured to perform a corrective action that modifies a configuration of the operator graph in response to a threshold of changes between the states of the information being reached. The state manager is configured to record the change from the first state to the second state. The state manager is configured to determine whether the change from the first state to the second state has caused the threshold of changes between the states of the information to be reached.

According to yet another aspect, embodiments disclose a computer program product for managing a streaming environment of an operator graph by monitoring changes between states of information stored within a memory of a first processing element executed on a first compute node of the operator graph. The first processing element is configured to process a set of tuples. The computer program product comprises a computer readable storage medium having program instructions embodied therewith. The program instructions are configured, when executed by a processor, to cause processor monitor the memory of the first processing element. The program instructions are further configured to cause the processor to identify a change in the information from a first state to a second state based on the monitoring. The program instructions are further configured to cause the processor to record the change from the first state to the second state. The program instructions are further configured to cause the processor to determine whether the change from the first state to the second state has caused a threshold of changes between the states of the information to be reached. The program instructions are further configured to cause the processor to perform a corrective action that modifies a configuration of the operator graph in response to the threshold of changes between the states of the information being reached.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to enhancing the quality of streams, and more specifically, to altering an operator graph of a stream computing environment in response to a change in the state of a processing element of the operator graph. While the present disclosure is not necessarily limited to such applications, various aspects of the disclosure may be appreciated through a discussion of various examples using this context.

One of the primary uses of computing systems (alternatively, computer systems) is to collect available information, manipulate the collected information, and make decisions based on the manipulated information. Existing computer systems may operate on information through means of databases that allow users to determine what has happened and to make predictions for future results based on past events. These computer systems receive information from a variety of sources and then record the information into permanent databases. After the information has been recorded in the databases, the computing systems run algorithms on the information sometimes generating new information and then performing associated transformations on and storing of the new information—to make determinations and provide context to users.

The ability of these existing computer systems to analyze information and provide meaning to users may be insufficient in some situations. The ability of large organizations, such as corporations and governments, to make decisions based on information analysis may be impaired by the limited scope of the information available. In addition, the analysis may be of limited value because it relies on stored structural databases that may contain out-of-date information. This may lead to decisions that are of limited value or, in some cases, inaccurate. For example, a weather forecast service may be unable to accurately predict precipitation for a given region, or a stock brokerage firm may make an incorrect decision regarding a trend in trading of shares.

The analytical shortcomings of existing computer systems may be compounded by other factors. First, the world is becoming more instrumented, as previously unintelligent devices are now becoming intelligent devices. Intelligent devices may include devices that have historically been unable to provide analytical information but with the additions of sensors can now do so (e.g., automobiles that are now able to provide diagnostic information to their owners or manufacturers, thermostats that now communicate information about daily temperature fluctuations in homes to users via webpages). Second, these shortcomings may also be compounded by an increase in communication from information sources, as previously isolated devices are now becoming interconnected (e.g., appliances within homes communicate with each other and with power utilities to more efficiently utilize electricity). These new sources of information may provide volumes of not only isolated data points but also relationships between the newly intelligent devices.

A third compounding factor is that users of computing systems may desire continuous analysis of streams of information, while current methods of data acquisition may provide only an event-based approach of analyzing pre-recorded information. For example, an existing analytics package may receive a finite amount of data and, later, apply analysis to the data. This approach may not work when dealing with a continuous stream of data. A fourth compounding factor is that existing computer systems may have deficiencies in handling not only the volume of information but also in dealing with the unstructured nature of the information; for example, sensors, cameras, and other new data sources may provide no context or format, just raw information. The existing analytics methods of conventional computing systems may need to modify and rearrange this data in order to provide any kind of context for the raw information. The modifications and rearrangements may take time or resources that many existing computing systems may not be able to provide.

Yet another potential drawback is that existing computing systems may not provide scalable solutions to new users. The advent of smart and connected devices has provided new use-cases for analytics of continuous streams of information. Modern systems of large-scale data collection, however, may require significant user training and provide unintuitive interfaces. For example, a farmer may have each animal on a farm instrumented with sensors to monitor the health and location of the animals. The data from these sensors may enable the farmer to respond to ever-changing health conditions of the animals, but only if the sensor data is collected and transformed into a usable format to provide meaningful information to the farmer in real-time. The farmer may not have the money to provide training and resources to a technical expert to construct a large-scale analytics package, and the obtained information may be left used.

I. Stream Computing

Stream-based computing (e.g., a stream application within a streaming environment) may provide users with a way to obtain meaning from extremely large sets of information (big-data). Stream computing may provide users with the ability to analyze information as it is captured but before it reaches a final destination (e.g., data from sensors being transmitted to a flat file, records being collected from internet queries and being stored to a database). In some embodiments, stream computing may provide users with the ability to analyze a stream of information that is too large to be captured and placed into a final destination (e.g., sensor values from thousands of sensors that will be discarded after being measured could be utilized by a stream computing application to provide detailed analysis). Stream computing may provide the bandwidth to process big-data continuously and in real-time (e.g., generating context from tens of millions of records per second with low latency from record reception to provide meaningful action in microseconds). Stream computing may provide users with the ability to utilize familiar programmatic conventions to provide context to big-data (e.g., using a structured language to retrieve, format, and conditionally select a subset of information regarding millions of records as those records are generated, using conditional language to trigger an action every few milliseconds based on traditional program statements applied every hundred microseconds).

Information flowing through a stream application may be in the form of streams. A stream may be made up of one or more tuples. A tuple may be a sequence of one or more associated attributes in a relational format. The tuples may share characteristics of a classical relational database (e.g., a single tuple may be similar to a row in a relational database and the attributes of a tuple may be similar to the columns of the row). The tuples may have non-relational database relationships to other tuples of a stream application (e.g., individual values, key-value pairs, flat files, etc.). Tuples may include values in a variety of known computer formats (e.g., integer, float, Boolean, string, etc.). Tuples may contain attributes about themselves, such as metadata. As used herein, a stream, streams, or data stream may refer to a sequence of tuples flowing through a stream application. Generally, a stream may be considered a pseudo-infinite sequence of tuples.

Figure 1:
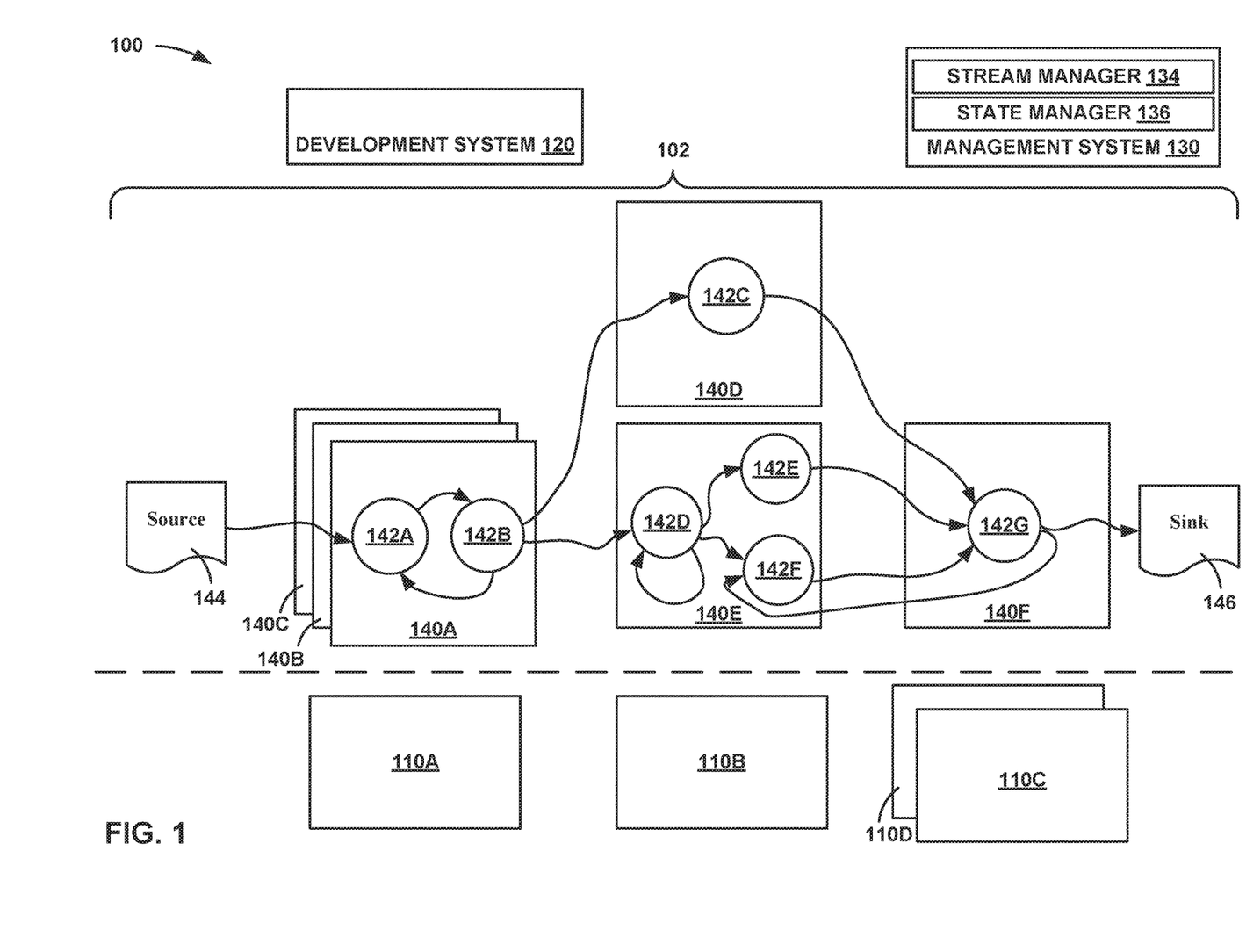
FIG. 1 depicts a stream computing application, according to various embodiments of the present disclosure.

FIG. 1 depicts a stream computing application (stream application) 100 consistent with embodiments of the present disclosure. The stream application 100 may be represented in the form of an operator graph 102. The operator graph 102 may visually represent to a user the flow of data through the stream application 100. The operator graph 102 may define how tuples are routed through the various components of the stream application 100 (e.g., an execution path). The stream application 100 may include one or more compute nodes 110A, 110B, 110C, and 110D (collectively, 110); a development system 120; a management system 130; one or more processing elements 140A, 140B, 140C, 140D, 140E, and 140F (collectively, 140); and one or more stream operators 142A, 142B, 142C, 142D, 142E, 142F, 142G (collectively, 142). The stream application 100 may receive information from one or more sources 144 and may output information to one or more sinks 146.

It should be appreciated that the stream application 100 depicted in FIG. 1 is for example purposes. Stream applications may vary in the number of compute nodes, processing elements, or stream operators. The stream application may also vary the roles and/or responsibilities performed by any of the components or may include other components not depicted. For example, some or all of the functionality of the development system 120 may be performed by the management system 130. In another example, the functionalities of the development system 120 and the management system 130 may be performed by a singular administrative system (stream manger 134). The administrative system may be configured to perform these tasks without deviation from the embodiments disclosed herein. In yet another example, the functionalities of the development system 120 and the management system 130 may be performed by a plurality of services (e.g., ten or more individual software programs each configured to perform a specific function).

The management system 130 may include a stream manager 134 and a state manager 136. The stream manager 134 may perform operations upon the operator graph 102. Operations upon the operator graph 102 may include taking down a processing element, adding operators to a processing element, fusing operators, etc., depending on the streaming environment. The operations upon the operator graph may be issued as a corrective action. The corrective action may be issued to repair issues within the streaming environment. The state manager 136 may monitor states of processing elements. States of processing elements will be described further herein.

Figure 2:
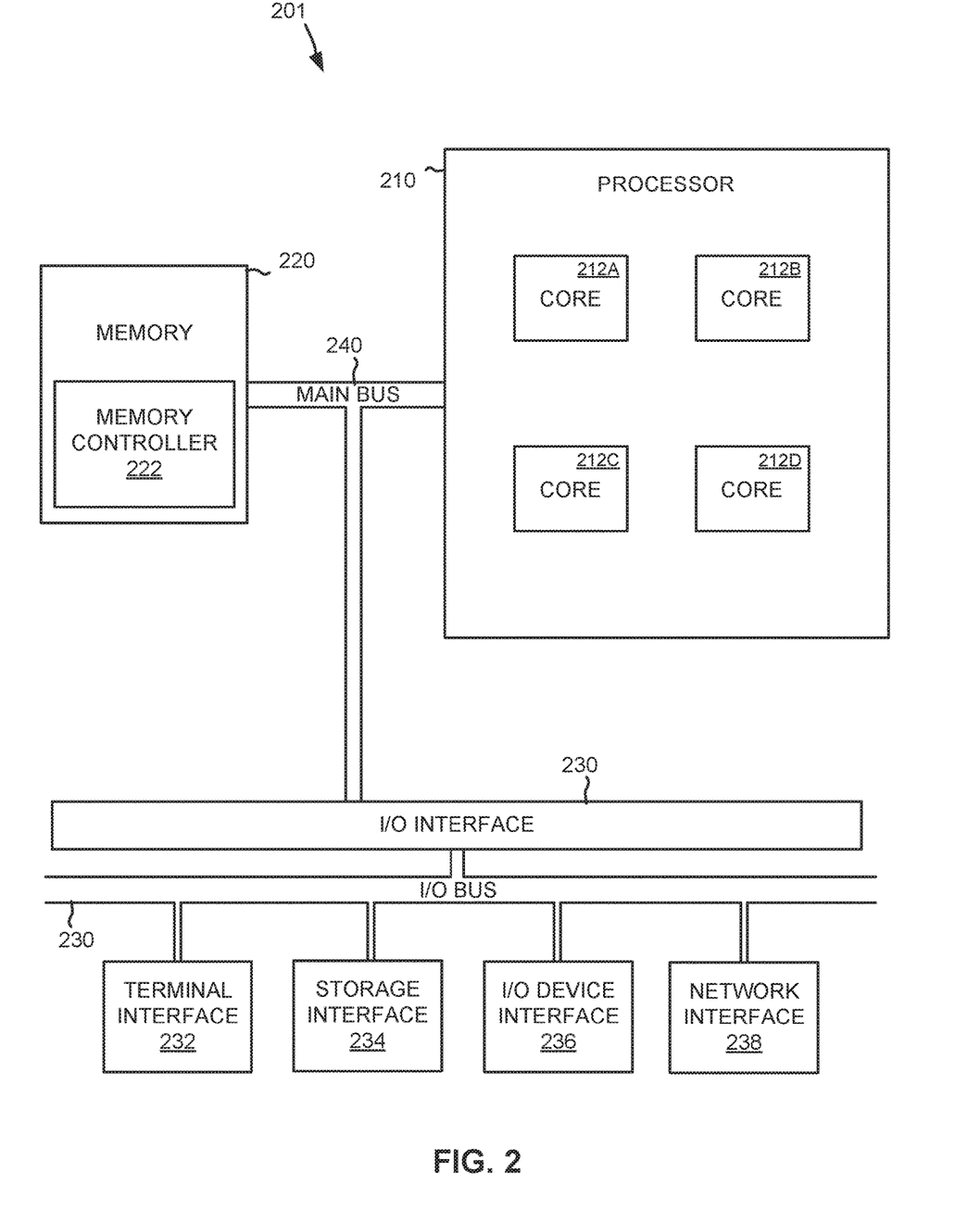
FIG. 2 depicts representative components of an example computer system that may be used, according to various embodiments of the disclosure.

The compute nodes 110 may be computer systems and may each include the following components: a processor, a memory, and an input/output interface (herein I/O). Each compute node 110 may also include an operating system or a hypervisor. In some embodiments, the compute nodes 110 may perform operations for the development system 120, the management system 130, the processing elements 140, and/or the stream operators 142. The compute nodes 110 may be categorized as management hosts, application hosts, or mixed-use hosts. A management host may perform operations for the development system 120 and/or the management system 130. An application host may perform operations for the processing elements 140 and stream operators 142. A mixed-use host may perform operations of both a management host and an application host. FIG. 2 depicts a computer system that may be a compute node consistent with embodiments of the present disclosure.

A network (not depicted) may commutatively couple each of the nodes 110 (e.g., a local area network, the Internet, etc.). For example, node 110A may communicate with nodes 110B, 110C, and 110D through the network. The computes nodes 110 may communicate with the network by way of the I/O. The network may include a variety of physical communication channels or links. The links may be wired, wireless, optical, or any other suitable media. The network may include a variety of network hardware and software for performing routing, switching, and other functions, such as routers, switches, or bridges. The nodes 110 may communicate through a variety of protocols (e.g., the internet protocol, the transmission control protocol, the file transfer protocol, the hypertext transfer protocol, etc.). In some embodiments, the nodes 110 may share the network with other hardware, software, or services (not depicted).

The development system 120 may provide a user with the ability to create a stream application that is targeted to process specific sets of data. The development system 120 may operate on a computer system (not depicted), such as the computer system depicted in FIG. 2. The development system 120 may operate on one or more of the compute nodes 110. The development system 120 may generate one or more configuration files that describe the stream computing application 100 (e.g., the processing elements 140, the stream operators 142, the sources 144, the sinks 146, the assignment of the aforementioned to the compute nodes 110, etc.). The development system 120 may receive requests from a user to generate the stream application 100. The development system 120 may receive requests from a user to generate other stream applications (not depicted). The development system 120 may communicate with the management system 130 to pass along the configuration on any stream applications it creates.

The development system 120 may generate the configuration by considering the performance characteristics of the software components (e.g., the processing elements 140, the stream operators 142, etc.) the hardware (e.g., the compute nodes 110, the network) and the data (e.g. the sources 144, the format of the tuples, etc.). In a first example, the development system 120 may determine that the overhead of running processing elements 140A, 140B, and 140C together on compute node 110A results in better performance than running them on separate compute nodes. The performance may be better because of a latency incurred by running processing elements 140A, 140B, and 140C across the network between, for example, compute nodes 110A and 110B. In a second example, the development system 120 may determine that the memory footprint of placing stream operators 142C, 142D, 142E, and 142F into a single processing element 140E is larger than the cache of a first processor in compute node 110B. To preserve memory space inside the cache of the first processor the development system 120 may decide to place only the stream operators 142D, 142E, and 142F into a single processing element 140E despite the inter-process communication latency of having two processing elements 140D and 140E.

In a third example of considering the performance characteristics, the development system 120 may identify a first operation (e.g., an operation being performed on processing element 140F on compute node 110C) that requires a larger amount of resources within the stream application 100. The development system 120 may assign a larger amount of resources (e.g., operating the processing element 140F on compute node 110D in addition to compute node 110C) to aid the performance of the first operation. The development system 120 may identify a second operation (e.g., an operation being performed on processing element 140A) that requires a smaller amount of resources within the stream application 100. The development system 120 may further determine that the stream application 100 may operate more efficiently through an increase in parallelization (e.g., more instances of processing element 140A). The development system 120 may create multiple instances of processing element 140A (e.g., processing elements 140B and 140C). The development system 120 may then assign processing elements 140A, 140B, and 140C to a single resource (e.g., compute node 110A). Lastly, the development system 120 may identify a third operation and fourth operation (e.g., operations being performed on processing elements 140D and 140E) that each require low levels of resources. The development system 120 may assign a smaller amount of resources to the two different operations (e.g., having them share the resources of compute node 110B rather than each operation being performed on its own compute node).

The development system 120 may include a compiler (not depicted) that compiles modules (e.g., processing elements 140, stream operators 142, etc.). The modules may be source code or other programmatic statements. The modules may be in the form of requests from a stream processing language (e.g., a computing language containing declarative statements allowing a user to state a specific subset from information formatted in a specific manner). The compiler may translate the modules into an object code (e.g., a machine code targeted to the specific instruction set architecture of the compute nodes 110). The compiler may translate the modules into an intermediary form (e.g., a virtual machine code). The compiler may be a just-in-time compiler that executes as part of an interpreter. In some embodiments, the compiler may be an optimizing compiler. In some embodiments, the compiler may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The management system 130 may monitor and administer the stream application 100. The management system 130 may operate on a computer system (not depicted), such as the computer system depicted in FIG. 2. The management system 130 may operate on one or more of the compute nodes 110. The management system 130 may also provide the operator graph 102 of the stream application 100. The management system 130 may host the services that make up the stream application 100 (e.g., services that monitor the health of the compute nodes 110, the performance of the processing elements 140 and stream operators 142, etc.). The management system 130 may receive requests from users (e.g., requests to authenticate and authorize users of the stream application 110, requests to view the information generated by the stream application, requests to view the operator graph 102, etc.).

The management system 130 may provide a user with the ability to create multiple instances of the stream application 100 configured by the development system 120. For example, if a second instance of the stream application 100 is required to perform the same processing, then the management system 130 may allocate a second set of compute nodes (not depicted) for performance of the second instance of the stream application. The management system 130 may also reassign the compute nodes 110 to relieve bottlenecks in the system. For example, as shown, processing elements 140D and 140E are executed by compute node 110B. Processing element 140F is executed by compute nodes 110C and 110D. In one situation, the stream application 100 may experience performance issues because processing elements 140D and 140E are not providing tuples to processing element 140F before processing element 140F enters an idle state. The management system 130 may detect these performance issues and may reassign resources from compute node 110D to execute a portion or all of processing element 140D, thereby reducing the workload on compute node 110B. The management system 130 may also perform operations of the operating systems of the compute nodes 110, such as the load balancing and resource allocation of the processing elements 140 and stream operators 142. By performing operations of the operating systems, the management system 130 may enable the stream application 100 to more efficiently use the available hardware resources and increase performance (e.g., by lowering the overhead of the operating systems and multiprocessing hardware of the compute nodes 110).

The processing elements 140 may perform the operations of the stream application 100. Each of the processing elements 140 may operate on one or more of the compute nodes 110. In some embodiments, a given processing element 140 may operate on a subset of a given compute node 110, such as a processor or a single core of processor of a compute node 110. In some embodiments, a given processing element 140 may operate on multiple compute nodes 110. The processing elements 140 may be generated by the development system 120. Each of the processing elements 140 may be in the form of a binary file and additionally library files (e.g., an executable file and associated libraries, a package file containing executable code and associate resources, etc.).

Each of processing elements 140 may include configuration information from the development system 120 or the management system 130 (e.g., the resources and conventions required by the relevant compute node 110 to which it has been assigned, the identity and credentials necessary to communicate with the sources 144 or sinks 146, the identity and credentials necessary to communicate with other processing elements, etc.). Each of the processing elements 140 may be configured by the development system 120 to run optimally upon one of the compute nodes 110. For example, processing elements 140A, 140B, and 140C may be compiled to run with optimizations recognized by an operating system running on compute node 110A. The processing elements 140A, 140B, and 140C may also be optimized for the particular hardware of compute node 110A (e.g., instruction set architecture, configured resources such as memory and processor, etc.).

Each of processing elements 140 may include one or more stream operators 142 that perform basic functions of the stream application 100. As streams of tuples flow through the processing elements 140, as directed by the operator graph 102, they pass from one stream operator to another (e.g., a first processing element may process tuples and place the processed tuples in a queue assigned to a second processing element, a first stream operator may process tuples and write the processed tuples to an area of memory designated to a second stream operator, tuples after processing may not be moved but may be updated with metadata to signify they are ready for processing by a new processing element or stream operator, etc.). Multiple stream operators 142 within the same processing element 140 may benefit from architectural efficiencies (e.g., reduced cache missed, shared variables and logic, reduced memory swapping, etc.). The processing elements 140 and the stream operators 142 may utilize inter-process communication (e.g., network sockets, shared memory, message queues, message passing, semaphores, etc.). The processing elements 140 and the stream operators 142 may utilize different inter-process communication techniques depending on the configuration of the stream application 100. For example: stream operator 142A may use a semaphore to communicate with stream operator 142B; processing element 140A may use a message queue to communicate with processing element 140C; and processing element 140B may use a network socket to communicate with processing element 140D.

The stream operators 142 may perform the basic logic and operations of the stream application 100 (e.g., processing tuples and passing processed tuples to other components of the stream application). By separating the logic that would conventionally occur within a single larger program into basic operations performed by the stream operators 142, the stream application 100 may provide greater scalability. For example, tens of compute nodes hosting hundreds of stream operators in a stream application may enable processing of millions of tuples per second. The logic may be created by the development system 120 before runtime of the stream application 100. In some embodiments, the sources 144 and the sinks 146 may also be stream operators 142. In some embodiments, the sources 144 and the sinks 146 may link multiple stream applications together (e.g., the sources 144 could be sinks for a second stream application and the sinks 146 could be sources for a third stream application). The stream operators 142 may be configured by the development system 120 to optimally perform the stream application 100 using the available compute nodes 110. The stream operators 142 may send and receive tuples from other stream operators. The stream operators 142 may receive tuples from the sources 144 and may send tuples to the sink 146.

The stream operators 142 may perform operations (e.g., conditional logic, iterative looping structures, type conversions, string formatting, etc.) upon the attributes of a tuple. In some embodiments, each stream operator 142 may perform only a very simple operation and may pass the updated tuple on to another stream operator in the stream application 100—simple stream operators may be more scalable and easier to parallelize. For example, stream operator 142B may receive a date value to a specific precision and may round the date value to a lower precision and pass the altered date value to stream operator 142D that may change the altered date value from a 24-hour format to a 12-hour format. A given stream operator 142 may not change anything about a tuple. The stream operators 142 may perform operations upon a tuple by adding new attributes or removing existing attributes.

The stream operators 142 may perform operations upon a stream of tuples by routing some tuples to a first stream operator and other tuples to a second stream operator (e.g., stream operator 142B sends some tuples to stream operator 142C and other tuples to stream operator 142D). The stream operators 142 may perform operations upon a stream of tuples by filtering some tuples (e.g., culling some tuples and passing on a subset of the stream to another stream operator). The stream operators 142 may also perform operations upon a stream of tuples by routing some of the stream to itself (e.g., stream operator 142D may perform a simple arithmetic operation and as part of its operation, it may perform a logical loop and direct a subset of tuples to itself). In some embodiments, a particular tuple output by a stream operator 142 or processing element 140 may not be considered to be the same tuple as a corresponding input tuple even if the input tuple is not changed by the stream operator or the processing element.

II. Monitoring for Changes in State

The operator graph of a streaming environment may be monitored by a stream manager of a management system for runtime diagnostics of the streaming environment. The management system may include an integrated development environment (IDE). The IDE may display runtime diagnostics to aid developers or end users in management of the streaming environment. Examples of runtime diagnostics may include the operator graph, the status of the streaming environment, and changes in state of processing elements.

The IDE may simultaneously monitor compute nodes, processing elements, and operators of the operator graph to determine optimization operations or corrective actions that may be performed upon the operator graph to increase the efficiency of the operator graph. The IDE may monitor the states of processing elements and operators. Although the IDE may monitor compute nodes, processing elements, and operators, for purposes of illustration, the processing element level will be monitored. In some embodiments, the usage of processing elements and operators may herein be used interchangeably without changing the scope of the disclosure.

The state of a processing element may include representations of information (states) that are stored within a memory allocated by the compute node. As a stream of tuples flows in and out of the processing element, the state of the memory of the processing element may be changed. The change in state of the processing element may be termed as a change in the state of the information or change in state. For example, the state information stored as states within the memory may include variables (scalar, or identifier). A state may be dependent on information stored within the memory as a state and the change in the state may include a change in the variable. The information may also be scalar types such as strings and integers that are stored as variables. The information may also be variables, which link to a hash table, a vector, an array, or a user-defined object. Additionally, state might be temporary objects not directly tied to compute variables such as space allocated to perform computational tasks.

Changes in the state may allow an end user to determine if a processing element requires a corrective action. For example, the corrective action may include resetting the processing element, splitting the processing element into two or more processing elements, merging two or more processing elements, or reducing the maintenance of the state. Reducing the maintenance of state may include reducing the amount of information that is stored within the processing element. For example, the information may be stored as a hash table, which may include 1000 entries. Based on the changes in the state, a corrective action may include reducing the amount of entries to 500 entries within the hash table. After performing the corrective action, the state profile may be reset. In an example, resetting the state profile may include returning the state profile to an original state profile generated when the streaming environment was initialized.

In various embodiments, the state profile may set a threshold on a hash table of changes or additions of state to the hash table. For example, the threshold set on the hash table may result in a corrective action upon reaching 1000 entries being recorded on the hash table. Upon a threshold of 1000 entries being reached, the number 1000 was predefined, such that when the hash table grows to this size it is automatically reduced to 500 entries. In another example, upon reaching a threshold of 1000 entries a part of the hash table, which has a certain value, can trigger the corrective action reducing or changing the hash table by splitting the hash table into multiple hash tables. In an additional example, a collision may be detected within a hash table; integers including that hash function may be filtered or split into another processing element or operator, which may repair the collision. The corrective action may split the hash table into portions based on the state, which may result in a duplication of an operator or split of states across multiple operators instead of using the hashing mechanism.

A state profile may be issued to each processing element of the operator graph and stored within the memory hosted by the processing element. The state profile may include a configuration, which informs the streams runtime and IDE about one or more states of each processing element. The state profile may define normal levels of changes in state for each state of the processing element and be used to determine and define changes in state greater than a threshold. Upon determining a change in state of a processing element, the state profile may include one or more possible corrective actions based on the determined change in state or based upon the number of changes in state over a period. The determination of a change in state may also include logging the change in state in a log file, an email alert, or redirecting the stream of tuples into a monitoring operator. For example, the state profile may include ten integers as variables. If a change in the ninth integer occurs, then the state profile may issue a corrective action to the IDE for the operator graph to alter the changes in state.

If a state profile of one or more states of a processing element is changing fewer times (or at slower rate) than a predetermined threshold, the state profile may be in a steady state. A steady state may include a second threshold below the threshold for determining if the changes in state require a corrective action. If the state profile is determined as a steady state, then corrective actions may be applied by having the processing element run different algorithms within the code such as calling a second method instead of a first method. For example, a first processing element may be monitored. If one or more states of the processing element are changing 1 time per 1000 tuples processed and a threshold for determining a steady state is set at 5 changes per 1000 tuples processed, then the state profile may be determined as a steady state. The determination of the steady state processing element may result in the processing element not receiving as many changes in state determinations.

FIG. 2 depicts the representative major components of an example computer system 201 that may be used, in accordance with embodiments of the present disclosure. It is appreciated that individual components may vary in complexity, number, type, and\or configuration. The particular examples disclosed are for example purposes only and are not necessarily the only such variations. The computer system 201 may comprise a processor 210, memory 220, an input/output interface (herein I/O or I/O interface) 230, and a main bus 240. The main bus 240 may provide communication pathways for the other components of the computer system 201. In some embodiments, the main bus 240 may connect to other components such as a specialized digital signal processor (not depicted).

The processor 210 of the computer system 201 may be comprised of one or more cores 212A, 212B, 212C, 212D (collectively 212). The processor 210 may additionally include one or more memory buffers or caches (not depicted) that provide temporary storage of instructions and data for the cores 212. The cores 212 may perform instructions on input provided from the caches or from the memory 220 and output the result to caches or the memory. The cores 212 may be comprised of one or more circuits configured to perform one or methods consistent with embodiments of the present disclosure. In some embodiments, the computer system 201 may contain multiple processors 210. In some embodiments, the computer system 201 may be a single processor 210 with a singular core 212.

The memory 220 of the computer system 201 may include a memory controller 222. In some embodiments, the memory 220 may comprise a random-access semiconductor memory, a storage device, or a storage medium (either volatile or non-volatile) for storing data and programs. In some embodiments, the memory may be in the form of modules (e.g., dual in-line memory modules). The memory controller 222 may communicate with the processor 210, facilitating storage and retrieval of information in the memory 220. The memory controller 222 may communicate with the I/O interface 230, facilitating storage and retrieval of input or output in the memory 220.

The I/O interface 230 may comprise an I/O bus 250, a terminal interface 232, a storage interface 234, an I/O device interface 236, and a network interface 238. The I/O interface 230 may connect the main bus 240 to the I/O bus 250. The I/O interface 230 may direct instructions and data from the processor 210 and memory 220 to the various interfaces of the I/O bus 250. The I/O interface 230 may also direct instructions and data from the various interfaces of the I/O bus 250 to the processor 210 and memory 220. In some embodiments, the various interfaces may include a subset of the aforementioned interfaces (e.g., an embedded computer system in an industrial application may not include the terminal interface 232 and the storage interface 234).

Logic modules throughout the computer system 201—including but not limited to the memory 220, the processor 210, and the I/O interface 230—may communicate failures and changes to one or more components to a hypervisor or operating system (not depicted). The hypervisor or the operating system may allocate the various resources available in the computer system 201 and track the location of data in memory 220 and of processes assigned to various cores 212. In embodiments that combine or rearrange elements, aspects and capabilities of the logic modules may be combined or redistributed. These variations would be apparent to one skilled in the art.

Figure 3:
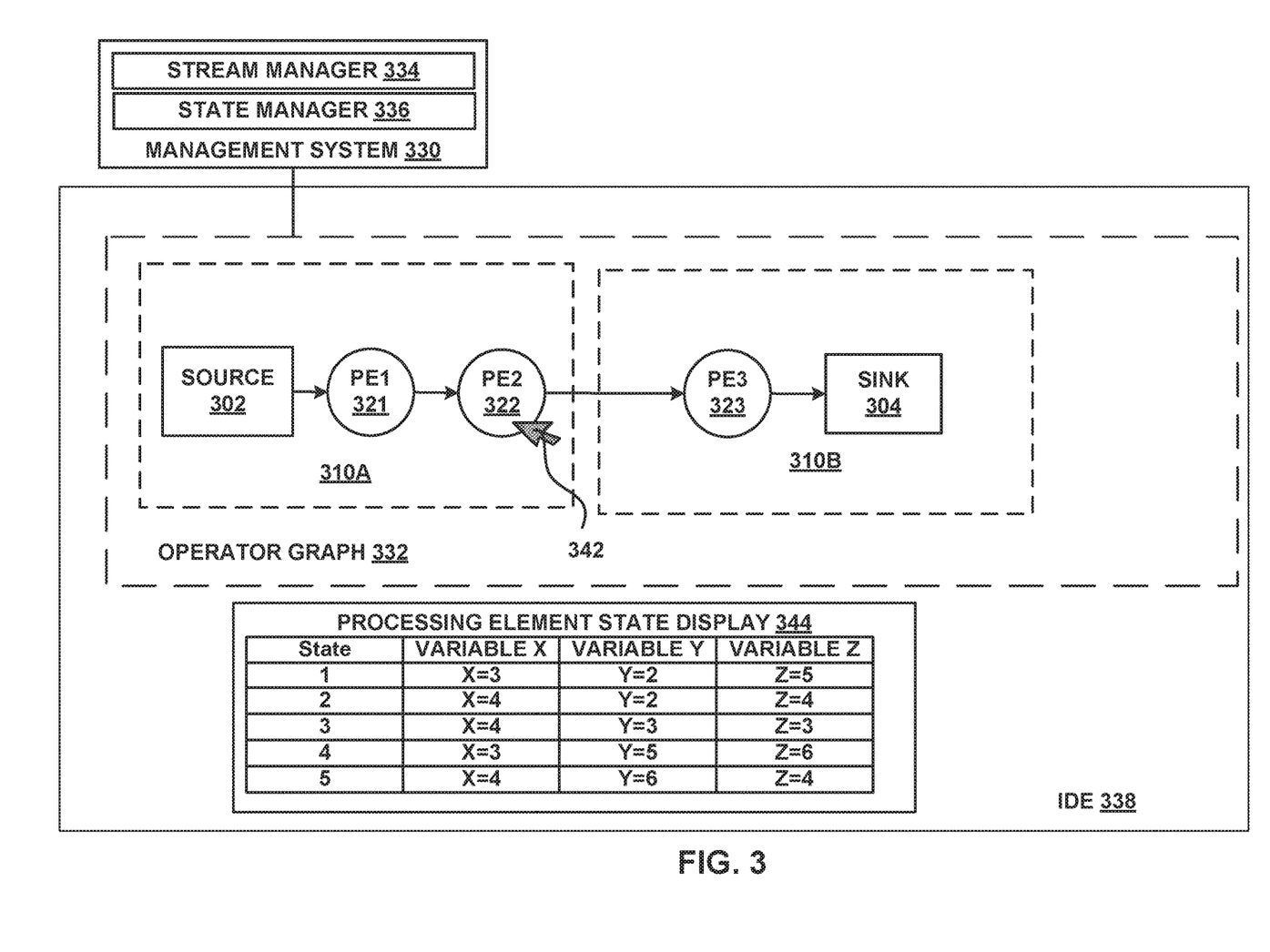
FIG. 3 depicts an integrated development environment where a processing element state display illustrates changes in the state of the processing element, according to various embodiments of the disclosure.

FIG. 3 depicts an integrated development environment where a processing element state display illustrates changes in a state profile of the processing element, according to embodiments. The integrated development environment (IDE) 338 may be a graphical user interface (GUI) including a display of the operator graph 332 and a processing element state display 344. The operator graph may include one or more compute nodes 310. The compute nodes 310 may include a first compute node 310A and a second compute node 310B. The first compute node 310A includes a source 302, a first processing element (PE1) 321, and a second processing element (PE2) 322. The second compute node 310B includes a third processing element (PE3) 323 and a sink 304. Tuples may enter the streaming environment of the operator graph 332 through the source 302 and exit the operator graph though the sink 304.

A stream manager 334 may monitor the operator graph 332, record changes in state, and perform (issue) corrective actions to the operator graph 332. A corrective action may include altering a processing element, adding an additional processing element to the operator graph, or changing the maintenance of the state profile. The corrective actions may be unlimited in function by creating a custom operator for a processing element. A custom operator may perform a specified function on tuples as they pass through the custom operator. The corrective actions may be issued by the management system 330 and/or by a user performing corrective actions through an IDE 338.

Figure 4:
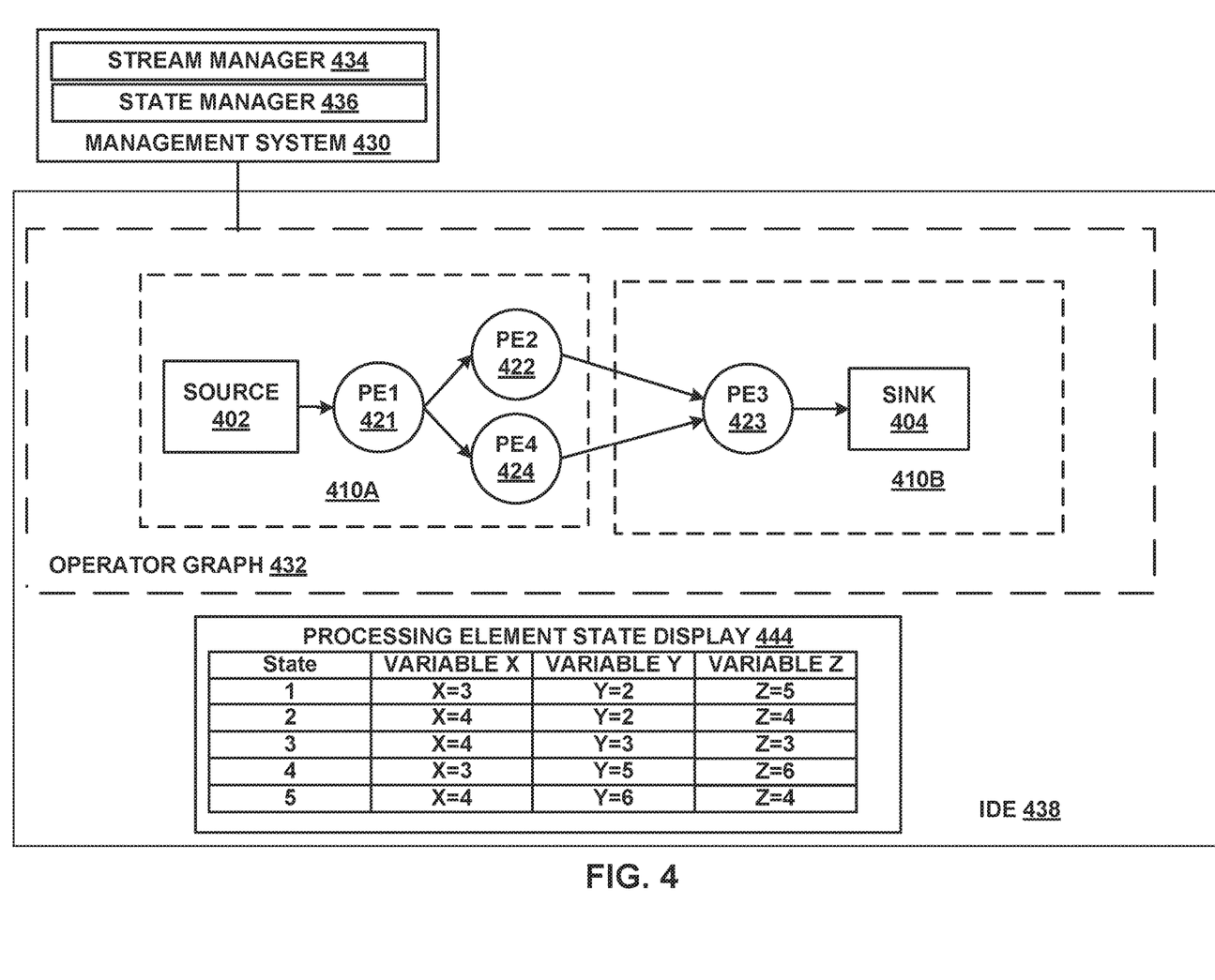
FIG. 4 depicts a corrective action being taken in response to a state change threshold being reached, according to various embodiments of the disclosure.

The stream manager 334 may record changes in a state of a processing element of the operator graph 332. Upon the determination of a change in a state of a processing element, the stream manager 334 may record the change in the state profile for that processing element. The recorded changes in state may be monitored by the management system 330 including a state manager 336. The state manager may store the state profiles of each of the processing elements within the operator graph 332. The state manager 336 may determine if a change in state results in a threshold of changes in states has occurred. If the threshold of changes in state has occurred, then the management system 330 may perform a corrective action (e.g., as shown in FIG. 4) on the processing element that has reached the threshold of changes in state.

The IDE 338 may display the processing element state display 344 and may include interactions on the streaming environment from a user. The user may input commands through a computing device, which may include an Input/Output (I/O). The I/O may receive the inputs from the user on a peripheral such as a keyboard and/or a mouse and translate the input into actions on the IDE 338. The input may be illustrated as a pointer 342, which a user may direct using a mouse or comparable computing interactive device. A user may operate the pointer 342 to select any processing element, which may display the processing element state display 344 of the selected processing element.

The processing element state display 344 may display a state profile including a state, one or more states, and/or previous states of a processing element. The processing element may be selected with the pointer 342 through the IDE 338 or by the management system 330. For example, the second processing element 322 may be selected with the pointer 342 and the processing element state display 344 of the second processing element may be displayed on the IDE 338. The state profile of the second processing 322 element may be stored within a memory of the second processing element, within the state manager 336, or within a memory of the first compute node 310A hosting the processing element. For example, the second processing element 322 may be selected with the pointer 342, and a current status of the state profile of the second processing element 322 may displayed. In particular, the state of a variable in the processing element memory may be displayed. For example, the display may show a first state where the state is a variable X=3.

The processing element state display 344 may display a state profile including the current state(s) of a processing element. For example, the second processing element may be monitored, and the current state first state may be that the variable X=3. The state may change when a tuple enters the second processing element instructing the second processing element to change the second state to X=4. The change in the state from the first state where X=3 to the second state where X=4 may be recorded by the streams manager as a change in state of within the state profile. In an additional example, the state may include a hash table including 500 entries taking up 5% of the memory of the hosting compute node. Upon reaching the 5% memory consumption of the hosting compute node, a corrective action may be issued to reduce the number of entries of the hash table.

In various embodiments, a change in state may include an addition of a state to the state profile. The addition of a state to the state profile may increase the changes in state of the state profile. For example, a second variable Y may be added to the state profile. In the first state profile, the state of the variable Y=2. The addition of the Y variable may be added to a changes in state of the state profile.

The processing element state display 344 may display one or more current states that together make up the state profile of a processing element. For example, the second processing element 322 may be monitored and the current state profile may include multiple variables, which may include X=3, Y=2, and Z=5. The one or more state variables of the state profile may change when a tuple enters the second processing element instructing the second processing element to change the one or more states. In an example, the variables of the one or more states may change to a second state where X=4 and Z=4. In an additional example, the variables of the one or states may change to a third state where X=4, Y=3, and Z=3. The state manager may determine the changes in state based on the number of changes or as a whole. In the example where the change in the first state to the second state includes X changing from X=3 to X=4, Y remaining at Y=2, and Z changing from Z=5 to Z=4, the number of changes in the state may be determined as two changes in state (number of changes), or one change in state (as a whole). In the example where the change in the first state to the third state includes X changing from X=3 to X=4, Y changing from Y=2 to Y=3, and Z changing from Z=5 to Z=3, the number of changes in the state may be determined as three changes in state (number of changes), or one change in state (as a whole). Depending on the configuration of the system, the number of changes per state of the state profile or the number of changes as a whole may be recorded on the processing element state display 344. In some embodiments, changes in state may be determined on a per variable level rather than a per processing element level. For example, a change in state of the variable X may be treated entirely separately from changes in state of the variable Y within the memory of the same processing element.

The processing element state display 344 may display previous states of the processing element. One or more previous changes in state of a state profile may be recorded by the state manager 336 and displayed on the processing element display 344. Displaying the previous changes in state may inform the user on the changes in state, how often changes in state are occurring, and where the changes in state are occurring. With the information on the changes in state, the user and/or management system 330 may determine if a corrective action is required.

FIG. 4 depicts a corrective action being taken based on a change in state of information in a processing element, according to embodiments. The corrective action may be a result of a threshold being reached for changes of a state profile of a processing element. The changes in state may be recorded by a state manager 436 of a management system 430, and the corrective actions may be executed by a stream manager 434 or a user through the IDE 438. The source 402 of the first compute node 410A may send tuples the first processing element 421, which splits the tuples, based on the state of the tuple to the second processing element 422 or the fourth processing element 424. Tuples processed by the second processing element 422 and the fourth processing element 424 may be joined together in a single stream again when sent to the third processing element 423 of the second compute node 410B. The third processing element 423 may process the tuples and send the tuples to the sink 404, which may write the tuples to a memory.

Upon the execution of a corrective action by the streams manager 334 of FIG. 3 on the operator graph 332 (FIG. 3), a new operator graph 432 may result from the second processing element 322 (FIG. 3) being split into a second processing element 422, and a fourth processing element 424 (PE4). The corrective action may also include a first processing element 421 of the operator graph 432 being assigned a split operation. For example, a split operator may be added at end of the first processing element 421. The split operation may distribute a set of the stream of tuples to the second processing element 422 and a set of the stream of tuples to the fourth processing element 424. For example, the split operator of the first processing element may determine the sets of tuples based on a state of a variable of the tuples. Two sets of tuples may be created if the tuples include a variable state where a first set of the stream of tuples includes the variable X=3, and the second set of the stream of tuples includes the variable X=4. If a tuple includes the variable X=3, then the tuple may be sent to the second processing element 422. If a tuple includes the variable X=4, then the tuple may be sent to the fourth processing element 424. The third processing element 423 may include a join operator placed at the beginning of the operators within the third processing element, to join the tuple streams sent from the second processing element 422 and the fourth processing element 424.

An example of the streaming environment receiving the corrective action to increase the efficiency of the streaming environment may include a calculation. For example, the calculation may be a thermal expansion calculation determining a change in length (area or volume) of a material. The calculation for determining the change in length of a material is $\Delta L=\alpha L\Delta T$, where L is the length, a is an expansion coefficient, and $\Delta T$ is the change in temperature (final temperature−starting temperature). In the example, the expansion coefficient may be monitored for changes in state and may result in a corrective action splitting the second processing element (FIG. 3) into the second and fourth processing elements (FIG. 4) due to a threshold of changes in state being reached of the expansion coefficient. For example, the state of the processing element may begin as Lead with a $28.0\times10^{-6}$ m/(m·K) and the change from a first state (Lead) to a second state changing the coefficient to Gold with an expansion coefficient of $14.2\times10^{-6}$ m/(m·K). The second processing element may receive and process tuples of the first state with the expansion coefficient of Lead, and the fourth processing element may receive and process tuples of the second state with expansion coefficient of Gold.

A corrective action may be determined based on a threshold of changes in a state of a state profile of a processing element. The threshold of changes in state may be determined over a period. The period may include a determined amount of time (time period), and/or a number of tuples processed. For example, a time period may include setting a threshold of the processing element state display 444 at a level of 25 changes in state within a time period of 2 minutes. If the changes in state of the processing element are 25 or above in a given 2 minute period, then the corrective action may be issued by a user on an IDE 438 or a state manager 436 and executed by a streams manager 434. In an additional example, the threshold of changes in state may include a determination based on the number of tuples processed. If the processing element state display 444 shows more than 25 changes in state every 1000 tuples processed, then a corrective action may be issued.

In various embodiments, an operator graph may be reconfigured based on the changes in state. A second determination may be made if a plurality of processing elements includes multiple changes in state. For example, if the processing element state display indicates that a plurality of processing elements include changes in state, then the operator graph may be changed such that an additional compute node may be added to split the operator graph to process tuples with the changed states and the original state separately. In the example, a fourth processing element may instead split the tuples from the first compute node to a third compute node ending with a second sink.

In various embodiments, a corrective action may include fusing one or more processing elements to a compute node of the operator graph. The corrective action of fusing the operators may include decoupling one or more processing elements from a first compute node, and fusing the one or more processing elements to a second compute node. For example, a first compute node may include three processing elements and corrective action may be determined for the second processing element of the three processing elements. The second processing element may be decoupled from the first processing element, and fused to a second compute node.

In various embodiments, a corrective action may include restarting the processing element. Restarting the processing element may include returning (resetting) the state of the processing element to an original state. The state of the processing element may change multiple times throughout the life of the processing element. Restarting the first processing element may also include changing a configuration of the processing element to a second configuration, where the second configuration increases the threshold of changes in state. For example, a first processing element may include a first configuration including three stored states. The first processing element may reach the threshold of changes in state and require a corrective action. The corrective action may include restarting the first processing element and changing the configuration of the first processing element to store seven states.

In various embodiments, restarting the processing element may include reducing the amount of information retained on the processing element as states. If a corrective action is determined for a processing element, then the amount of information retained may be reduced to reduce the changes in state. For example, a first configuration of a first processing element may include a hash table with 100 entries. A corrective action may be issued to reduce the changes in state of the first processing element. To reduce the changes in state the corrective action may include reducing the entries of the hash table to 50 entries.

Figure 5:
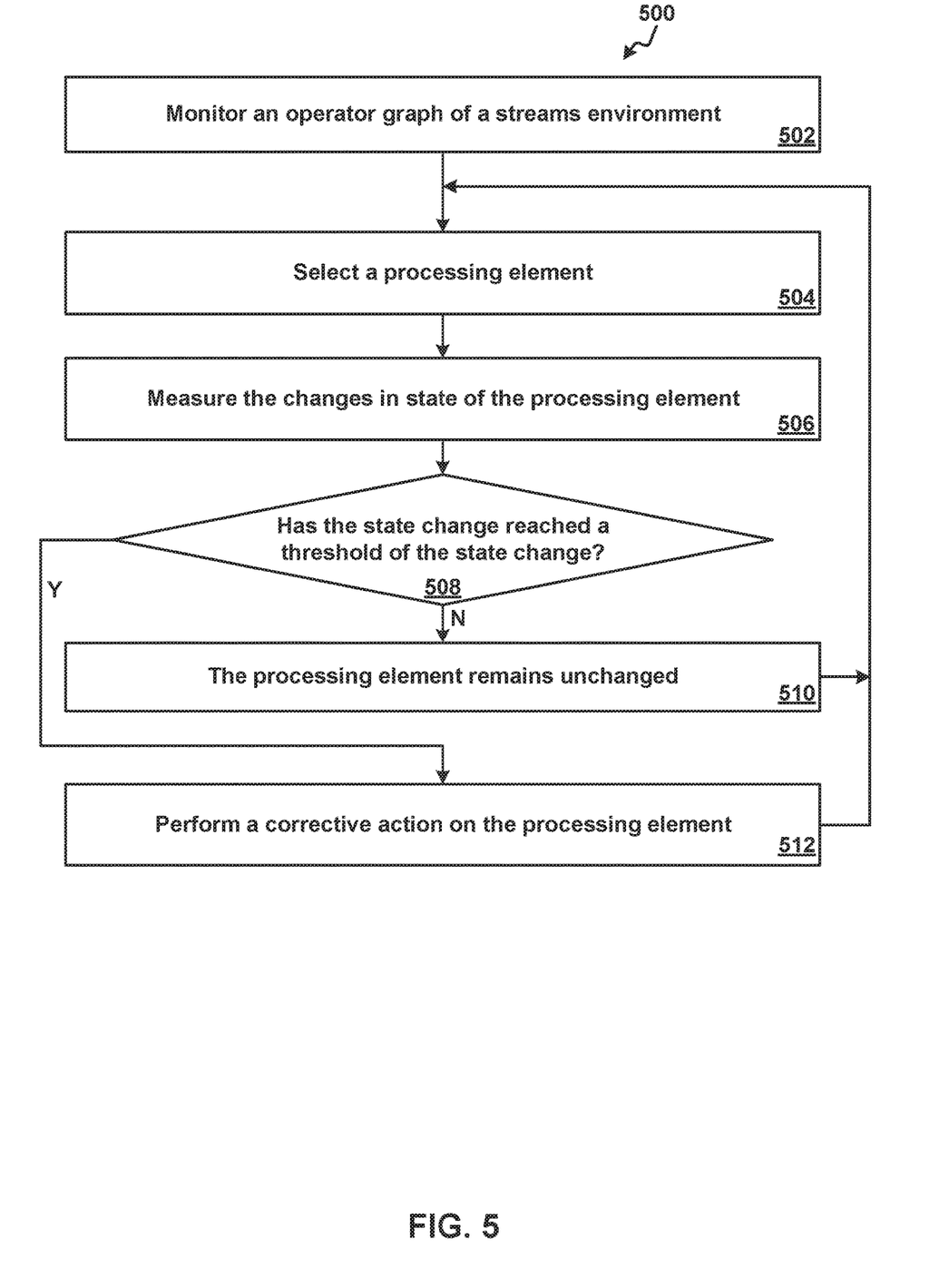
FIG. 5 depicts a flowchart of a method for monitoring state changes in an operator graph, according to various embodiments of the disclosure.

FIG. 5 depicts a flowchart of a method 500 for monitoring state changes in an operator graph, according to embodiments. A corrective action may be determined by a management system, which may monitor a processing element of an operator graph. The method 500 may result in a processing element being issued a corrective action altering the processing element and/or operator graph.

In operation 502, an operator graph of a streams environment is monitored. A management system may monitor the operator graph. The management system may include a streams manager and a state manager. The management system may perform the method 500 to determine if a processing element requires a corrective action.

In various embodiments, a user may monitor the operator graph of the streams environment using an IDE. Using the steps of method 500, the user may determine and perform a corrective action on a processing element of an operator graph. The user may access the operator graph though an IDE where the user may monitor a processing element state display of a plurality of processing elements of the operator graph.

In operation 504, a first processing element is selected for analysis. The first processing element may be selected from an operator graph. The first processing element may composed of one or more operators. The one or more operators may perform operations upon tuples as the tuples enter and exit the operators of the processing element. The processing element may be executed on a compute node.

In operation 506, the changes in state of the first processing element are measured. The changes in state may be measured by determining if a first state of a state profile of the first processing element has changed to a second state. Throughout the processing of a stream of tuples, states of variables may be altered. For example, a variable may be altered (changed) from a first state to become a second state. The change from the first state to the second state may be a result of processing a tuple of the stream of tuples by the processing element. The tuple may include a function (operation) which may require a change in the state of the processing element to be processed by the processing element. For example, the first state of the state profile may be a variable where X=3. If the variable changes from a first state where X=3 to a second state where X=4 when processing the tuple, then the second state may be recorded and determined as a change in state.

In various embodiments, the second state of the processing element may be changed back to the first state (or even to a third state) upon a second tuple entering the first processing element. The second tuple may return the processing element from the second state to the original first state of the state profile. For example, an original first state is X=3, but the current state is the second state where X=4. If a second tuple changes the current second state of X=4 back to the first state of X=3, then the state may be recorded as a change in state. In various embodiments, the number of tuples processed in the second state of X=4 may be recorded.

In various embodiments, the first processing element may include a plurality of states. The processing element for example may contain one or more operators, which include their own respective states or individual operators, which include multiple states. In an example, a processing element has a plurality of operators having three states including X=3, Y=4, Z=5. A change in state may be recorded when one or more of the states are changed. In various embodiments, only one change in state may be recorded if all of the states are recorded as a first state. For example, if the first state of X=3, Y=4, and Z=5 changes to X=2, Y=4, and Z=4, then one change in state may be recorded even though two changes have occurred.

In various embodiments, the change in state may include the introduction of a new variable. A state profile of a processing element may include a determined number states that are stored. A new state may be added to the state profile of the processing element changing the state profile, as a change in state. The change in state may be recorded and used to determine if the changes in state have reached the threshold. For example, the state profile of a first processing element may store three states. A fourth state may be added to the state profile, the addition of the fourth state may result in the determination of a corrective action where tuples including the fourth state may be sent to a second processing element to be processed.

In various embodiments, the change in state may include the deletion of an existing variable or state. The state profile may include a determined number of states that are stored. A state tuple may delete a state from the state profile. For example, the tuple may not be able to be process if the deleted state remained on the state profile. The change in state may be recoded and used to determine if the changes in state have reached the threshold. For example, the state profile of a first processing element may store three states. The second state of the state profile may be deleted from the state profile; the deletion of the second state may result in the determination of a corrective action where tuples including the deleted second state may be sent to a second processing element to be processed.

In operation 508, a determination is made if the changes in state have reached the threshold of changes in state. The threshold of changes in state may include a time period, and/or a number of tuples processed. For example, the period may include a period of time, where the period of time is a two minute period. In an additional example, the period may be number of tuples processed, where the period is every 1000 tuples processed.

The number of changes in state that are recorded are then compared to the threshold of changes. If the number of changes in state remains below the threshold, then the method 500 may progress to operation 510. For example, the threshold of changes in state may be 10 changes in state for every 1000 tuples processed. If the state of the processing element is recorded as changing 3 times after processing 1000 tuples, then the threshold has not been reached and the method 500 may progress to operation 510.

If the number of changes in state reaches or exceeds the threshold then the method 500 may progress to operation 512. For example, the threshold of changes in state may be 10 changes in state for every 1000 tuples processed. If the state of the processing element is recorded as changing 12 times after processing 1000 tuples, then the threshold has been reached and exceeded and the method 500 may progress to operation 512.

In operation 510, the processing element remains unchanged. If the threshold of changes has not been reached, then the processing element may be considered as a steady state profile. A steady state profile of a processing element may include a state profile including fewer changes in state than a threshold. The method 500 may return to operation 504 where another processing element is selected. The method 500 may repeat indefinitely or until all processing elements have been checked.

In operation 512, a corrective action is performed on the processing element. The corrective action may be performed by the streams manager to reduce the number of changes in state. For example, the processing element may be split into two processing elements. If the processing element is split into two separate processing elements, then a processing element upstream of the split processing element may also receive a split operator. The spilt operator may be configured to determine which processing element to send certain tuples to. In an additional example, the corrective action may include reducing the amount of state information maintained. If the state is not required to be stored, then states of the processing element may be reduced or not stored at all.

In various embodiments, the corrective action may include modifying the stream of tuples. A corrective action may include sorting the stream of tuples based on a state. For example, the streaming environment may process 100 tuples per minute. Of the 100 tuples 50 tuples may have a first state of a variable where X=3 and 50 tuples may have a second state of a variable where X=4. Due to the code, the tuples may be made such that each tuple has the opposite X value as the one before it (e.g., the order goes X=3, X=4, X=3, X=4, X=3, X=4, and so on). Instead of changing the state of a processing element of the streaming environment with each processed tuple, the tuples with the second state may be rerouted into a processing element configured to hold the tuples with the second state until the completion of the processing of the tuples of the first state. After processing the 50 tuples with the first state, then the 50 tuples with the second state may be processed. By processing each state separately, only one change in state may occur over the 100 processed tuples, resulting in 50 straight tuples of the first state (X=3) followed by 50 straight tuples of the second state (X=4).

In various embodiments, the corrective action may be performed on a processing element that is not the processing element that exceeded the threshold of changes in state. The processing element that exceeded the threshold of changes in state may receive a reduced number of changes in state if an upstream processing element receives a corrective action. For example, an operator graph may include a first processing element and a second processing element. The second processing element may receive tuples, which were processed by the first processing element, and the second processing element may be determined to have reached a threshold of changes in state. A corrective action may include adding a filter operator to the first processing element where the filter operator may remove tuples, which may reduce changes in the state of the second processing element.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing a streaming environment of an operator graph by monitoring changes between states of information stored within a memory of a first processing element of a first compute node within the operator graph, the first processing element configured to process a set of tuples, the method comprising:
    monitoring the memory of the first processing element;
    identifying, based on the monitoring, a change in the information stored in the memory of the first processing element from a first state to a second state, the change in the information occurring in response to processing a particular tuple of the set of tuples;
    recording the change from the first state to the second state;
    determining whether the change from the first state to the second state has caused a threshold of changes between the states of the information to be reached; and
    performing, in response to the threshold being reached, a corrective action that modifies a configuration of the operator graph.

2. The method of claim 1, wherein the information is a variable, and wherein the particular tuple instructs the first processing element to change the variable.

3. The method of claim 1, wherein the change from the first state to the second state is displayed on a graphical user interface.

4. The method of claim 1, wherein changes between the states are recorded over a predetermined amount of time, and wherein the threshold is based on changes occurring over the period of time.

5. The method of claim 1, wherein the corrective action includes splitting the first processing element into two separate processing elements.

6. The method of claim 1, wherein the corrective action includes fusing the first processing element to a second compute node of the operator graph.

7. The method of claim 1, wherein the information is stored as a hash table and the threshold of changes is reaching a predefined number of entries in the hash table.

8. The method of claim 1, wherein the information comprises two or more variables.

9. A system for managing a streaming environment of an operator graph by monitoring changes between states of information stored within a memory of a first processing element of a first compute node within the operator graph, the first processing element configured to process a set of tuples, the system comprising:
    a system memory;
    a processor device communicatively coupled to the system memory;
    a stream manager communicatively coupled to the system memory and the processor device, wherein the stream manager is configured to:
        monitor the memory of the first processing element,
        identify, based on the monitoring, a change in the information stored in the memory of the first processing element from a first state to a second state, the change in the information occurring in response to processing a particular tuple of the set of tuples, and
        perform, in response to a threshold of changes between the states of the information being reached, a corrective action that modifies a configuration of the operator graph; and
    a state manager communicatively coupled to the system memory and the processor device wherein the state manager is configured to:
        record the change from the first state to the second state, and
        determine whether the change from the first state to the second state has caused the threshold of changes between the states of the information to be reached.

10. The system of claim 9, wherein the information is a variable, and wherein the particular tuple instructs the first processing element to change the variable.

11. The system of claim 9, wherein the change from the first state to the second state is displayed on a graphical user interface.

12. The system of claim 9, wherein changes between the states are recorded over a predetermined amount of time, and wherein the threshold is based on changes occurring over the period of time.

13. The system of claim 9, wherein the corrective action includes splitting the first processing element into two separate processing elements.

14. The system of claim 9, wherein a corrective action includes fusing the first processing element to a second compute node of the operator graph.

15. The system of claim 9, wherein the information is stored as a hash table and the threshold of changes is reaching a predefined number of entries in the hash table.

16. The system of claim 9, wherein the information comprises two or more variables.

17. A computer program product for managing a streaming environment of an operator graph by monitoring changes between states of information stored within a memory of a first processing element of a first compute node within the operator graph, the first processing element configured to process a set of tuples, the computer program product comprising a computer readable storage medium having program instructions embodied therewith, the program instructions configured, upon execution by a processor, to cause the processor to:

monitor the memory of the first processing element;

identify, based on the monitoring, a change in the information stored in the memory of the first processing element from a first state to a second state, the change in the information occurring in response to processing a particular tuple of the set of tuples;

record the change from the first state to the second state;

determine whether the change from the first state to the second state has caused a threshold of changes between the states of the information to be reached; and perform, in response to the threshold being reached, a corrective action that modifies a configuration of the operator graph.

18. The computer program product of claim 17, wherein the corrective action includes splitting the first processing element into two separate processing elements.

19. The computer program product of claim 17, wherein the corrective action includes fusing the first processing element to a second compute node of the operator graph.

20. The computer program product of claim 17, wherein the information is stored as a hash table and the threshold of changes is reaching a predefined number of entries in the hash table.

* * * * *